(12) United States Patent
Fornarotto (10) Patent No.: US 10,870,958 B2
(45) Date of Patent: Dec. 22, 2020

(54) ROBOTIC FECES COLLECTION ASSEMBLY

(71) Applicant: Dawn Fornarotto, Belleville, NJ (US)

(72) Inventor: Dawn Fornarotto, Belleville, NJ (US)

( * ) Notice: Subject to any disclaimer, the term of this patent is extended or adjusted under 35 U.S.C. 154(b) by 339 days.

(21) Appl. No.: 15/912,112

(22) Filed: Mar. 5, 2018

(65) Prior Publication Data

US 2019/0271125 A1 Sep. 5, 2019

(51) Int. Cl.
*E01H 1/00* (2006.01)
*A01K 1/01* (2006.01)
*G05D 1/02* (2020.01)

(52) U.S. Cl.
CPC .............. *E01H 1/006* (2013.01); *A01K 1/01* (2013.01); *G05D 1/0242* (2013.01)

(58) Field of Classification Search
CPC ........ A01K 1/01; A01K 27/009; A01K 15/02; E01H 1/006; G05D 1/0242; G05D 19/42; B25J 9/16; B64C 39/024; C08F 290/046; F04D 29/281; G01S 1/70
See application file for complete search history.

(56) References Cited

U.S. PATENT DOCUMENTS

| | | | |
|---|---|---|---|
| 5,618,898 A * | 4/1997 | Nagasawa | C08F 290/046 526/245 |
| 6,618,898 B2 | 9/2003 | Tingle | |
| 7,328,671 B2 * | 2/2008 | Kates | G01S 1/70 119/720 |
| 7,424,867 B2 * | 9/2008 | Kates | A01K 15/02 119/720 |
| 7,769,490 B2 * | 8/2010 | Abramson | F04D 29/281 180/167 |
| 8,408,160 B1 | 4/2013 | Pozin | |
| 8,601,637 B2 * | 12/2013 | Mainini | G05D 1/0242 15/319 |
| 9,067,315 B2 * | 6/2015 | Kawamoto | B25J 9/16 |
| D760,806 S | 7/2016 | Cmich et al. | |
| 9,538,728 B2 * | 1/2017 | Womble | A01K 27/009 |
| 9,936,680 B2 * | 4/2018 | Womble | A01K 27/009 |
| 10,049,278 B2 * | 8/2018 | Womble | A01K 27/009 |
| 10,518,409 B2 * | 12/2019 | Oleynik | G05B 19/42 |
| 10,555,498 B2 * | 2/2020 | Womble | B64C 39/024 |
| 2005/0166354 A1 | 8/2005 | Uchigashi | |
| 2010/0176611 A1 | 7/2010 | Merino-Garcia | |
| 2015/0240433 A1 | 8/2015 | Sorbello | |
| 2015/0272413 A1 * | 10/2015 | Miyake | A47L 11/38 701/23 |

OTHER PUBLICATIONS

Shen et al., Multi-Agent Hierarchical Reinforcement Learning by Integrating Options into MAXQ, 2006, IEEE, p. 1-7 (Year: 2006).*
An Autonomous Dog Poop Robt, 2017, YouTube (https://www.youtube.com/watch?v=2BNcjTnvmtE) (Year: 2017).*

* cited by examiner

*Primary Examiner* — McDieunel Marc (57) ABSTRACT

A robotic feces collection assembly for automatically collecting pet feces in a yard includes a robot that travels along ground. The robot has a storage chamber therein and a plurality of grabbers. Each of the grabbers selectively engages animal feces on the ground and positions the animal feces in the storage chamber. A guidance unit is coupled to the robot for visually detecting the animal feces on the ground. The guidance unit is electrically coupled to the robot such that the guidance unit guides the robot to the animal feces for collecting the animal fees.

1 Claim, 7 Drawing Sheets

ROBOTIC FECES COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to collection devices and more particularly pertains to a new collection device for automatically collecting pet feces from a yard.

BRIEF SUMMARY OF THE INVENTION

An embodiment of the disclosure meets the needs presented above by generally comprising a robot that travels along ground. The robot has a storage chamber therein and a plurality of grabbers. Each of the grabbers selectively engages animal feces on the ground and positions the animal feces in the storage chamber. A guidance unit is coupled to the robot for visually detecting the animal feces on the ground. The guidance unit is electrically coupled to the robot such that the guidance unit guides the robot to the animal feces for collecting the animal fees.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
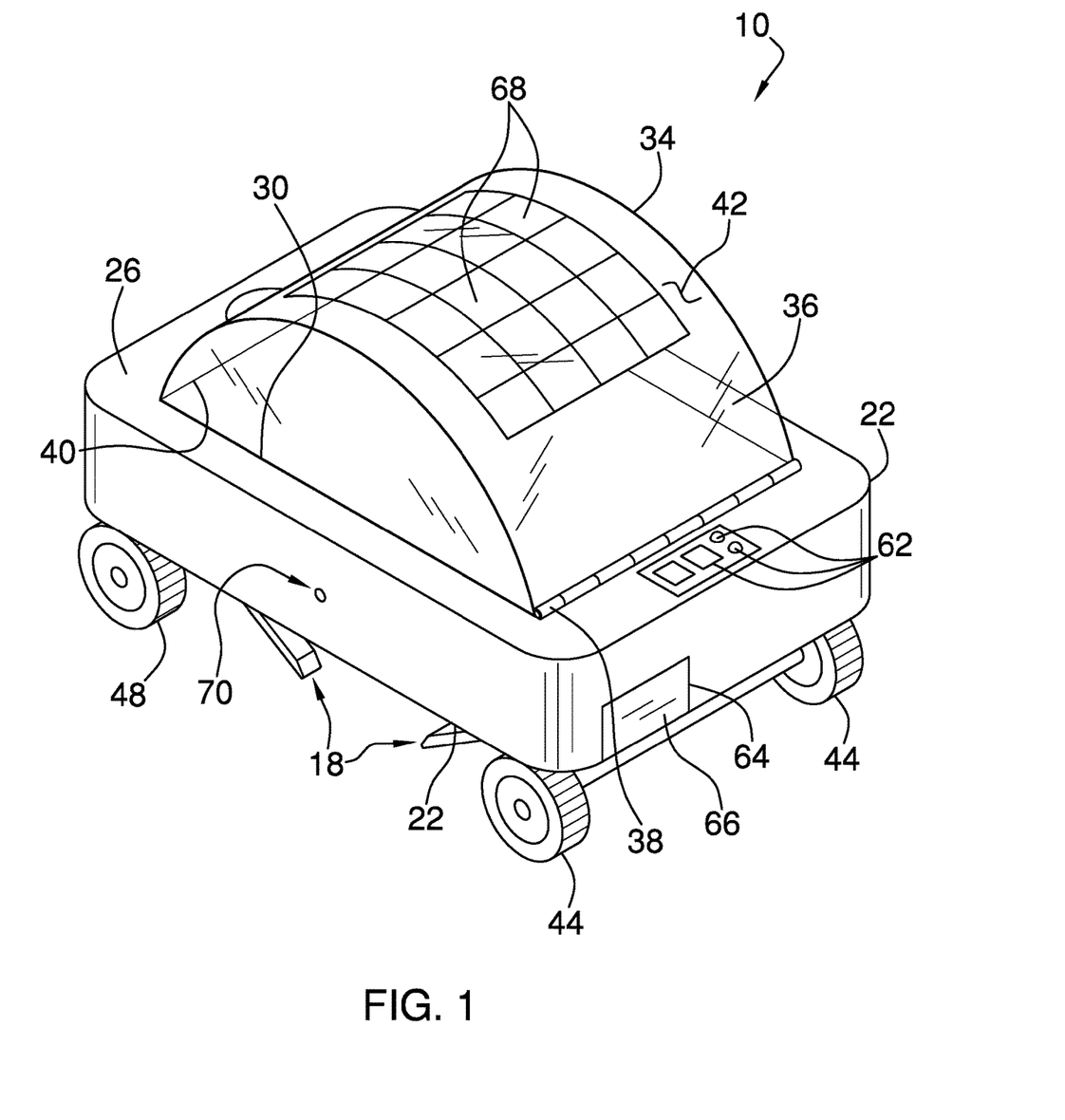
FIG. 1 is a top perspective view of a robotic feces collection assembly according to an embodiment of the disclosure.
Figure 2:
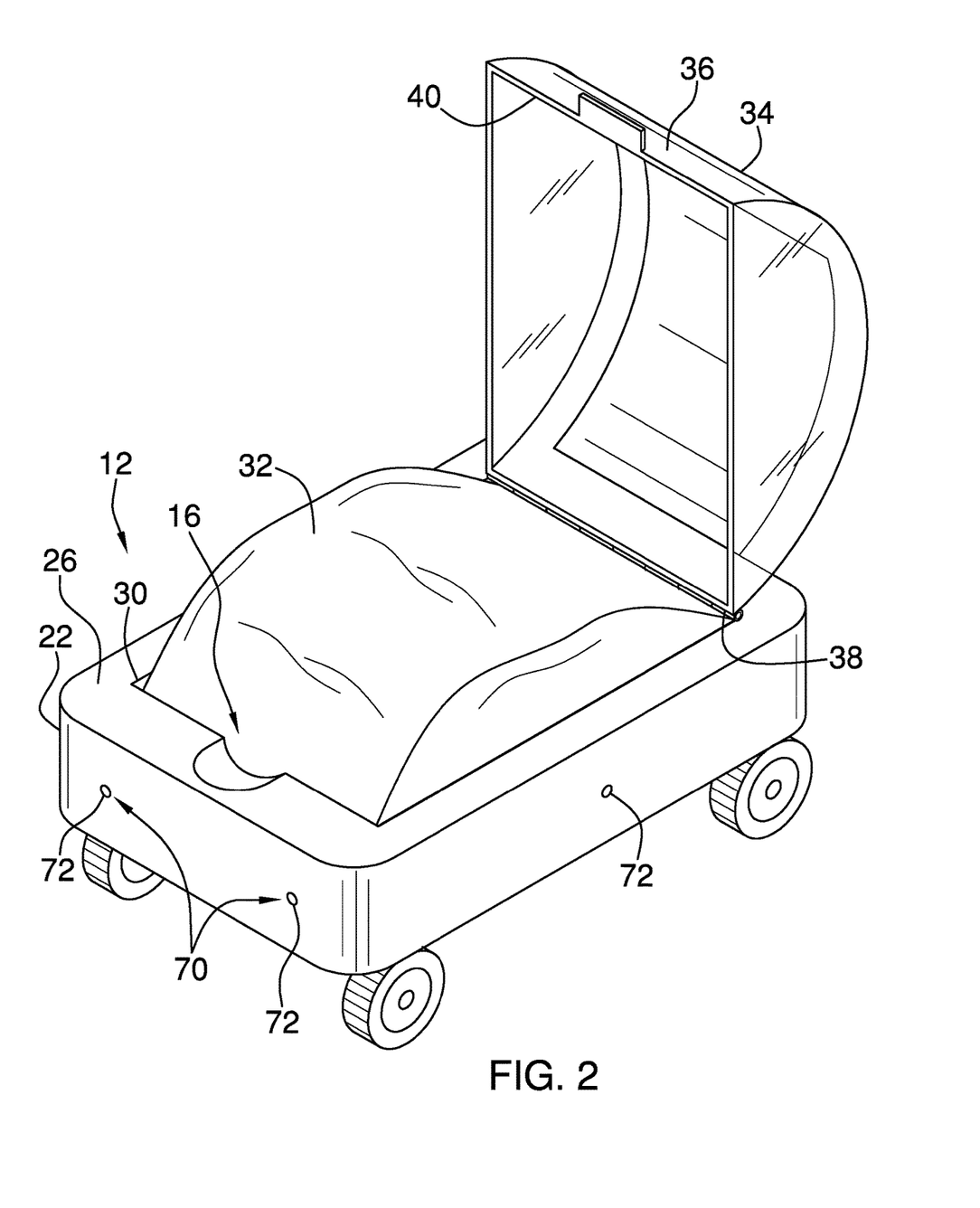
FIG. 2 is a front perspective view of an embodiment of the disclosure.
Figure 3:
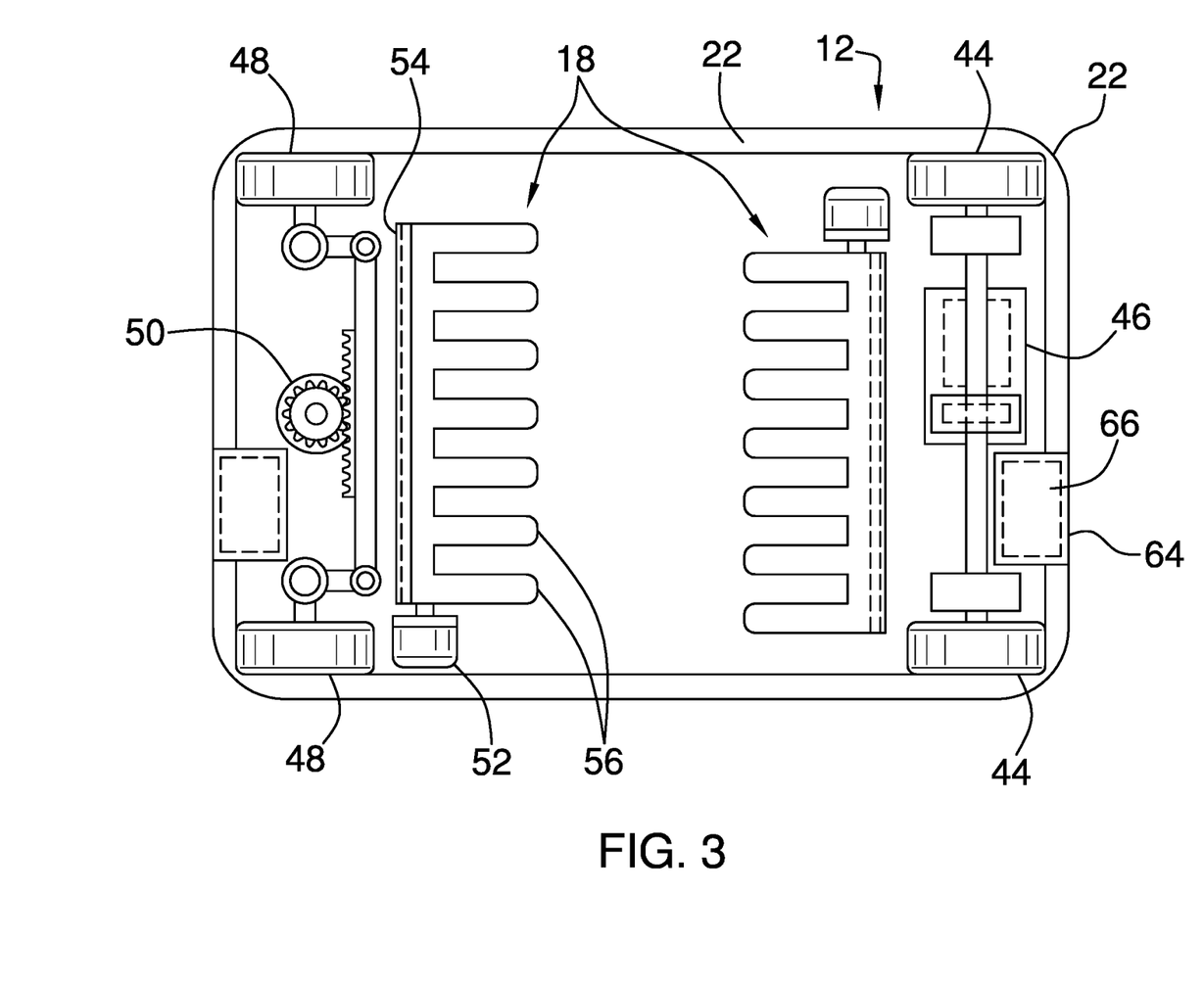
FIG. 3 is a bottom view of an embodiment of the disclosure.
Figure 4:
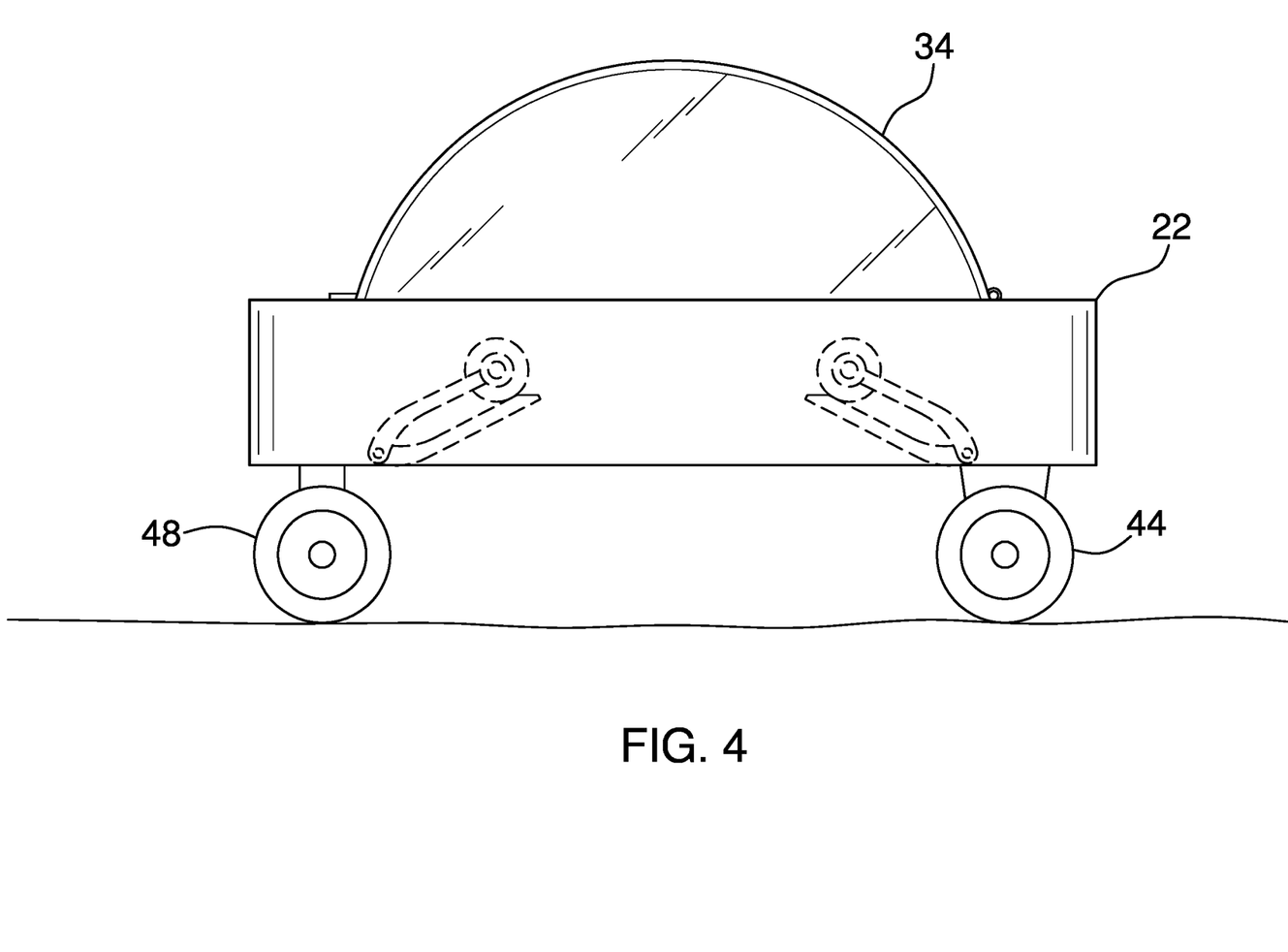
FIG. 4 is a right side phantom view of an embodiment of the disclosure.
Figure 5:
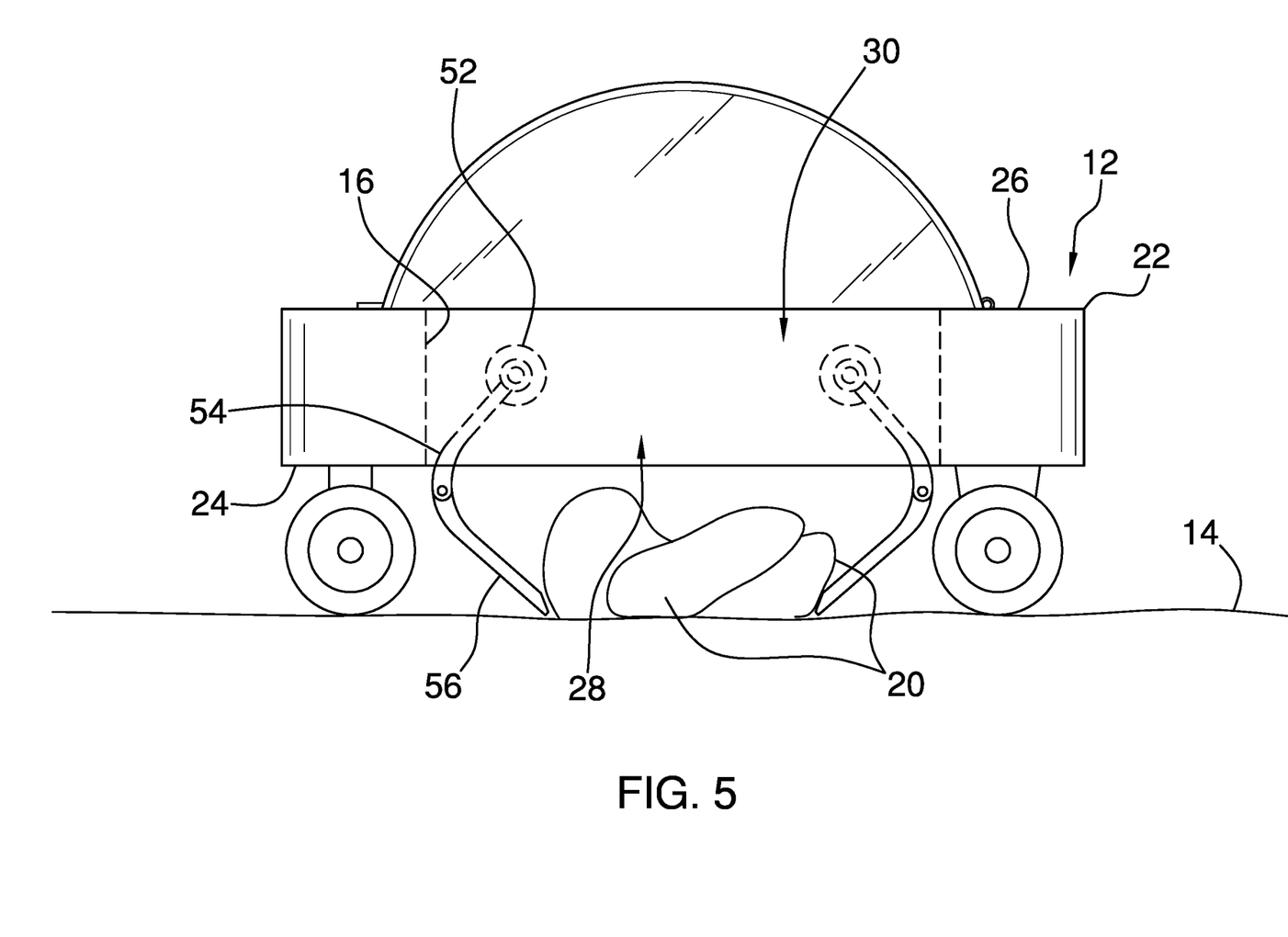
FIG. 5 is a perspective in-use view of an embodiment of the disclosure showing a grabber collecting animal feces.
Figure 6:
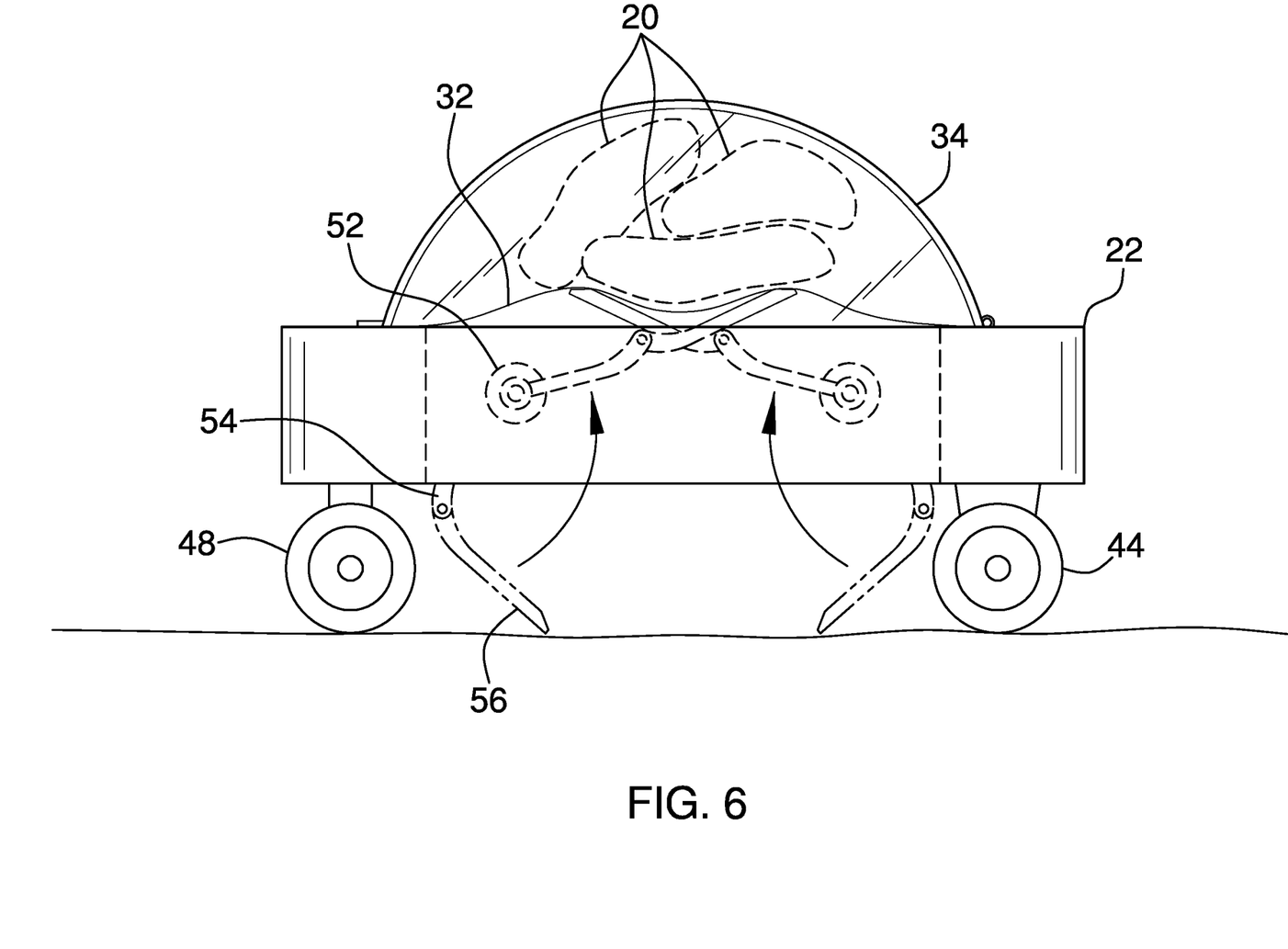
FIG. 6 is a perspective in-use view of an embodiment of the disclosure showing a grabber lifting animal feces into a bag.
Figure 7:
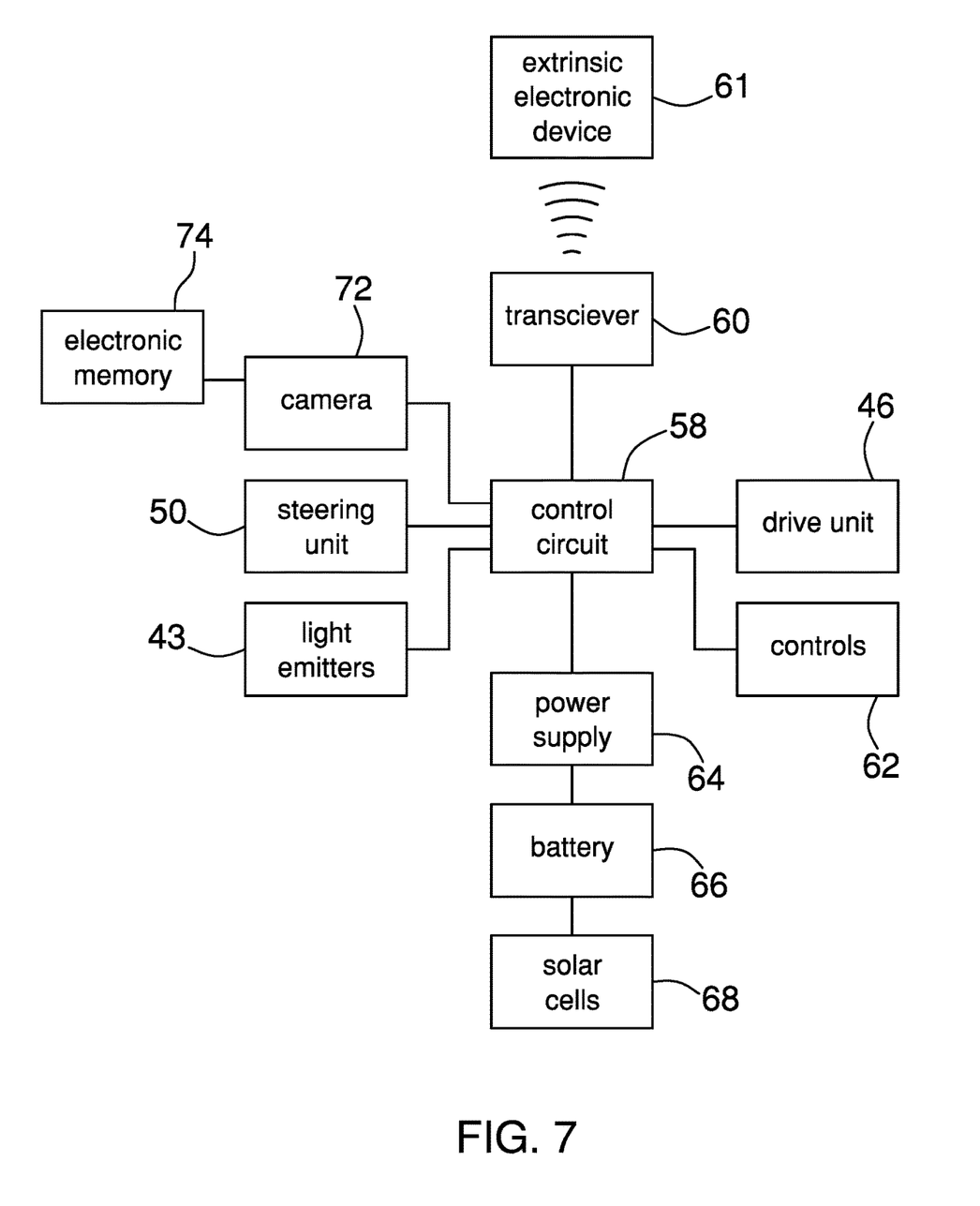
FIG. 7 is a schematic view of an embodiment of the disclosure.

With reference now to the drawings, and in particular to FIGS. 1 through 7 thereof, a new collection device embodying the principles and concepts of an embodiment of the disclosure and generally designated by the reference numeral 10 will be described.

As best illustrated in FIGS. 1 through 7, the robotic feces collection assembly 10 generally comprises a robot 12 that travels along ground 14. The ground 14 may be a lawn at a residence or the like. The robot 12 has a storage chamber 16 therein and a plurality of grabbers 18. Each of the grabbers 18 selectively engages animal feces 20 on the ground 14 and positions the animal feces 20 in the storage chamber 16. In this way the animal feces 20, from a domesticated animal such as a dog or the like, is collected from the lawn without requiring a pet owner to manually collect the animal feces 20.

The robot 12 comprises a housing 22 that has the storage chamber 16 positioned therein. The housing 22 has a bottom wall 24 wall and a top wall 26 and the bottom wall 24 wall has a first opening 28 extending into the storage chamber 16. The top wall 26 has a second opening 30 extending into the storage chamber 16. A bag 32 is removably positioned within the storage chamber 16 and the bag 32 may be a plastic bag 32 or the like.

A lid 34 is provided that has an outside wall 36 having a first edge 38 and a second edge 40. The first edge 38 is hingedly coupled to the top wall 26 of the housing 22 such that the lid 34 selectively closes the second opening 30. The outside wall 36 has an outwardly facing surface 42 and the outside wall 36 may be concavely arcuate with respect to the top wall 26 of the housing 22. Thus, the lid 34 may form a bisected cylinder to define said storage chamber and the lid 34 may be comprised of a translucent material. A plurality of light 43 emitters may be provided and the light emitters 43 may be coupled to the lid 34 for illuminating the lid 34.

A pair of first rollers 44 is provided and each of the first rollers 44 is rotatably attached to the bottom wall 24 wall to roll along the ground 14. Each of the first rollers 44 may comprise wheels or the like. A drive unit 46 is coupled to the housing 22 and the drive unit 46 is mechanically coupled to each of the first rollers 44. The drive unit 46 is turned on to rotate in a first direction such that the drive unit 46 rotates each of the first rollers 44 in a first direction to urge the housing 22 forwardly along the ground 14. Additionally, the drive unit 46 is turned on to rotate in a second direction such that the drive unit 46 rotates gates of the first rollers 44 in a second direction to urge the housing 22 rearwardly the along the ground 14. The drive unit 46 may include an axle extending between the first rollers 44 and an electric motor that is rotatably coupled to the axle, a plurality of enmeshing gears that engages each of the first rollers 44 and an electric motor that rotates the enmeshing gears and any other type of electronic drive unit commonly found in robotics.

A pair of second rollers 48 is provided and each of the second rollers 48 is rotatably attached to the bottom wall 24 wall to roll along the ground 14. Each of the second rollers 48 is pivotal about an axis extending through the top wall 26 and the bottom wall 24 wall of the housing 22 for steering the housing 22 along the ground 14. Additionally, each of the second rollers 48 may comprise wheels or the like. A steering unit 50 is coupled to the housing 22 and the steering unit 50 is mechanically coupled to each of the second rollers 48. The steering unit 50 urges each of the second rollers 48 to pivot in a first direction to steer the housing 22 in the first direction. The steering unit 50 urges each of the second rollers 48 to pivot in a second direction to steer the housing 22 in a second direction. The steering unit 50 may include a rack and pinion with a corresponding electric motor, electric servos and any other electronic steering unit commonly found in robotics. Alternatively, instead of the first rollers 44 and the second rollers 48, the drive unit 46 may include a pair of crawler tracks on each side of the housing 22 for steering and to urge the housing 22 along the ground.

Each of the grabbers 18 is oriented on the housing 22 to face each other and each of the grabbers 18 comprises a motor 52 that is positioned in the storage chamber 16 of the housing 22. The motor 52 associated with the grabbers 18 may be an electric motor or the like. An arm 54 is pivotally coupled to the motor. The motor urges the arm 54 into a first position having the arm 54 extending downwardly from the bottom wall 24 wall of the housing 22. The motor 52 urges the arm 54 into a second position having the arm 54 being positioned in the storage chamber 16.

Each of the grabbers 18 includes plurality of fingers 56 and each of the fingers 56 corresponding to each of the grabbers 18 is pivotally coupled to the arm 54 of the corresponding grabber. Each of the fingers 56 corresponding to each of the grabbers 18 is mechanically coupled to the motor. The motor urges the fingers 56 into a gripping position when the arm 54 is positioned in the first position. Thus, each of the fingers 56 extends to the ground 14 to engage the animal feces 20. The motor urges the fingers 56 into a depositing position when the arm 54 is positioned in the second position. Thus, each of the fingers 56 extends into the storage chamber 16 to lift and deposit the animal feces 20 in the bag 32 that is positioned in the storage chamber.

A control circuit 58 is coupled to the housing 22 and the control circuit 58 is electrically coupled to the drive unit 46, the steering unit 50 and the motor. A transceiver 60 is coupled to the housing 22 and the transceiver 60 is electrically coupled to the control circuit 58. Moreover, the transceiver 60 is in wireless electrical communication with an extrinsic electronic device 61, such as a smart phone or the like, for receiving remote control commands from the extrinsic electronic device 61. The transceiver 60 may be a radio frequency transceiver 60 or the like and the transceiver 60 may employ a WPAN signal and Bluetooth communication protocols.

A plurality of controls 62 is provided and each of the controls 62 is movably coupled to the housing 22. Each of the controls 62 is electrically coupled to the control circuit 58 for controlling operational parameters of the drive unit 46 and the steering unit 50. Additionally, the controls 62 are manipulated to program operational data such as dimensions of the yard and the like. The plurality of controls 62 may include a touch screen, a plurality of buttons and any other common type of electronic robotic control.

A power supply 64 is coupled to the housing 22 and the power supply 64 is electrically coupled to the control circuit 58. The power supply 64 comprises at least one battery 66 that is removably coupled to the housing 22 and a plurality of solar cells 68. Each of the solar cells 68 is coupled to the outwardly facing surface 42 of the lid 34 such that each of the solar cells 68 is exposed to sunlight when the lid 34 is closed. Each of the solar cells 68 is electrically coupled to the at least one battery 66 for recharging the at least one battery 66.

A guidance unit 70 is coupled to the robot 12 for detecting the animal feces 20 on the ground 14. The guidance unit 70 is electrically coupled to the robot 12 such that the guidance unit 70 guides the robot 12 to the animal feces 20 for collecting the animal feces 20. In this way the robot 12 automatically locates and collects the animal feces 20 without human intervention.

The guidance unit 70 comprises a camera 72 that is coupled to the housing 22 for capturing images of the ground 14. The camera 72 is electrically coupled the control circuit 58 and the camera 72 may be a digital camera or the like. Additionally, the camera 72 may be an electronic camera commonly employed in image recognition technology and may include conventional image recognition circuitry commonly found in robot 12*ics*. The guidance unit 70 may include an additional camera that is coupled to the bottom wall 24 wall of the housing 22 for guiding the robot 12 to align the grabbers 18 with the animal feces 20. Alternatively, the guidance unit 70 may employ any conventional electronics with respect to having the robot 12 position itself on the ground 14 to align the grabbers 18 with the animal feces 20.

An electronic memory 74 is coupled to the housing 22 and the electronic memory 74 is electrically coupled the camera 72. The electronic memory 74 stores data comprising image detection software and other electronic data commonly associated with robot 12*ics*. In this way the camera 72 is facilitated to recognize animal feces 20 on the ground 14. The control circuit 58 calculates a route to the animal feces 20 based upon the camera 72 recognizing the animal feces 20. The control circuit 58 may include a GPS transceiver for calculating the physical location of the robot 12 and the physical location of the detected animal feces 20.

In use, the robot 12 is positioned outside in the yard or the like to collect animal feces 20 that has collected in the yard. The camera 72 records the area around the robot 12 and the camera 72 recognizes animal feces 20 in the yard. The control circuit 58 calculates a route to the animal feces 20 and the robot 12 drives itself to align the grabbers 18 with the animal feces 20. Each of the grabbers 18 is urged to scoop the animal feces 20 up from the ground 14 and lift the animal feces 20 upwardly into the storage chamber 16. Additionally, the grabbers 18 deposit the animal feces 20 in the bag 32 that is positioned in the storage chamber 16. In this way the animal feces 20 is contained in the bag 32 for subsequent removal via opening the lid 34 and removing the bag 32 from the storage chamber 16. The robot 12 is selectively remotely operated via the extrinsic electronic device for collecting the animal feces 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A robotic feces collection assembly being configured to collect animal feces for disposal, said assembly comprising:
   a robot that travels along ground, said robot having a storage chamber therein and a plurality of grabbers, each of said grabbers selectively engaging animal feces on the ground and positioning the animal feces in said storage chamber, said robot comprising:
      a housing having said storage chamber being positioned therein, said housing having a bottom wall and a top wall, said bottom wall having a first opening extending into said storage chamber, said top wall having a second opening extending into said storage chamber;
      a bag being removably positioned within said storage chamber;
      a lid being hingedly coupled to said top wall of said housing such that said lid selectively closes said second opening, said lid having an outwardly facing surface;
      a pair of first rollers, each of said first rollers being rotatably attached to said bottom wall wherein each of said first rollers is configured to roll along the ground;
      a drive unit being coupled to said housing, said drive unit being mechanically coupled to each of said first rollers, said drive unit being turned on to rotate in a first direction such that said drive unit rotates each of said first rollers in a first direction to urge said housing forwardly along the ground, said drive unit being turned on to rotate in a second direction such that said drive unit rotates gates of said first rollers in a second direction to urge said housing rearwardly the along the ground;
      a pair of second rollers, each of said second rollers being rotatably attached to said bottom wall wherein each of said second rollers is configured to roll along the ground, each of said second rollers being pivotal about an axis extending through said top wall and said bottom wall of said housing for steering said housing along the ground;
      a steering unit being coupled to said housing, said steering unit being mechanically coupled to each of said second rollers, said steering unit urging each of said second rollers to pivot in a first direction to steer said housing in said first direction, said steering unit urging each of said second rollers to pivot in a second direction to steer said housing and said second direction;
   each of said grabbers being oriented in said housing to face each other, each of said grabbers comprising:
      a motor being positioned in said storage chamber of said housing;
      an arm being pivotally coupled to said motor, said motor urging said arm into a first position having said arm extending downwardly from said bottom wall of said housing, said motor urging said arm into a second position having said arm being positioned in said storage chamber; and
      a plurality of fingers, each of said fingers being pivotally coupled to said arm, each of said fingers being mechanically coupled to said motor, said motor urging said fingers into a gripping position when said arm is positioned in said first position having each of said fingers extending to the ground wherein each of said fingers is configured to engage the animal feces, said motor urging said fingers into a depositing position when said arm is positioned in said second position having each of said fingers extending into said storage space wherein each of said fingers configured to deposit the animal feces in said bag in said storage space;
   a control circuit being coupled to said housing, said control circuit being electrically coupled to said drive unit, said steering unit and said motor;
   a transceiver being coupled to said housing, said transceiver being electrically coupled to said control circuit, said transceiver being in wireless electrical communication with an extrinsic electronic device for receiving remote control commands from the extrinsic electronic device;
   a plurality of controls, each of said controls being movably coupled to said housing, each of said controls being electrically coupled to said control circuit for controlling operational parameters of said drive unit and said steering unit;
   a power supply being coupled to said housing, said power supply being electrically coupled to said control circuit, said power supply comprising:
      at least one battery being removably coupled to said housing; and
      a plurality of solar cells, each of said solar cells being coupled to said outwardly facing surface of said lid wherein each of said solar cells is configured to be exposed to sunlight, each of said solar cells being electrically coupled to said at least one battery for recharging said at least one battery; and
   a guidance unit being coupled to said robot for detecting the animal feces on the ground, said guidance unit being electrically coupled to said robot such that said guidance unit guides said robot to the animal feces for collecting the animal fees said guidance unit comprising:

a camera being coupled to said housing such that said camera is configured to capture images of the ground, said camera being electrically coupled said control circuit; and an electronic memory being coupled to said housing, said electronic memory being electrically coupled said camera, said electronic memory storing data comprising image detection software wherein said camera is configured to recognize animal feces on the ground, said control circuit calculating a route to the animal feces based upon said camera recognizing the animal feces.

* * * * *